United States Patent [19]
Beaton

[11] Patent Number: 5,226,497
[45] Date of Patent: Jul. 13, 1993

[54] CARRIER/EXCAVATOR REMOTE OPERATING SYSTEM

[76] Inventor: Eric Beaton, 6145 Walker Rd., Utica, N.Y. 13502

[21] Appl. No.: 831,165

[22] Filed: Feb. 5, 1992

[51] Int. Cl.$^5$ ............................................. B60K 25/00
[52] U.S. Cl. .................................. 180/53.4; 180/53.2; 180/53.7; 180/53.8; 180/324; 180/327; 180/333
[58] Field of Search .................. 180/53.1, 53.2, 53.4, 180/53.7, 53.8, 198, 321, 324, 326, 327, 333

[56] References Cited

U.S. PATENT DOCUMENTS

| | | | |
|---|---|---|---|
| 2,761,569 | 9/1956 | Iserman | 180/324 X |
| 2,959,260 | 11/1960 | Johnson et al. | 180/324 X |
| 3,599,814 | 8/1971 | Brownfield | 180/324 X |
| 4,318,451 | 3/1982 | Liggett | 180/321 X |
| 4,700,802 | 10/1987 | Fought | 180/324 |
| 4,705,450 | 11/1987 | Gano | 180/324 X |

*Primary Examiner*—David M. Mitchell
*Assistant Examiner*—Andrew C. Pike
*Attorney, Agent, or Firm*—Katherine McGuire

[57] ABSTRACT

Apparatus, for the remote control of a carrier vehicle from the cab of an excavator which is rotatably mounted upon the back bed of the carrier vehicle through a center pin assembly, is accomplished with a hydrostatic pump operably connected to the crankshaft of the carrier engine. Electric controls in the excavator cab connect to the pump which selectively directs fluid to a motor which rotates a first gear which meshes with a second gear fixed to the carrier vehicle drive shaft. In alternate embodiments, the motor connects to a power take-off on the transmission. Carrier steering, braking, and throttle functions are also remotely controlled at the excavator cab through a combination of electric and hydraulic controls with the electric wires extending from the electric controls in the excavator cab, through a slip ring on the center pin assembly and to the respective function controls at various sites on the carrier vehicle. There are thus no hydraulic lines extending from the excavator to the carrier vehicle. The present invention is discussed primarily in connection with a carrier vehicle/excavator combination although other applications are also discussed.

16 Claims, 8 Drawing Sheets

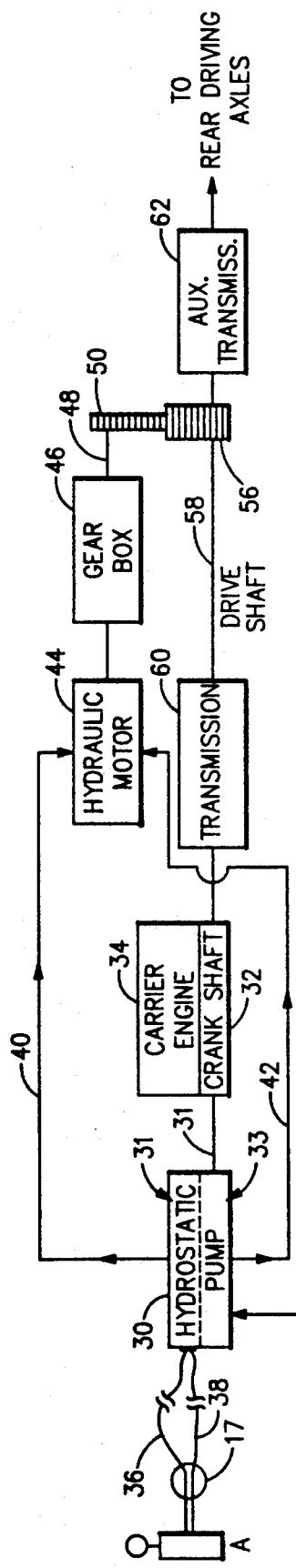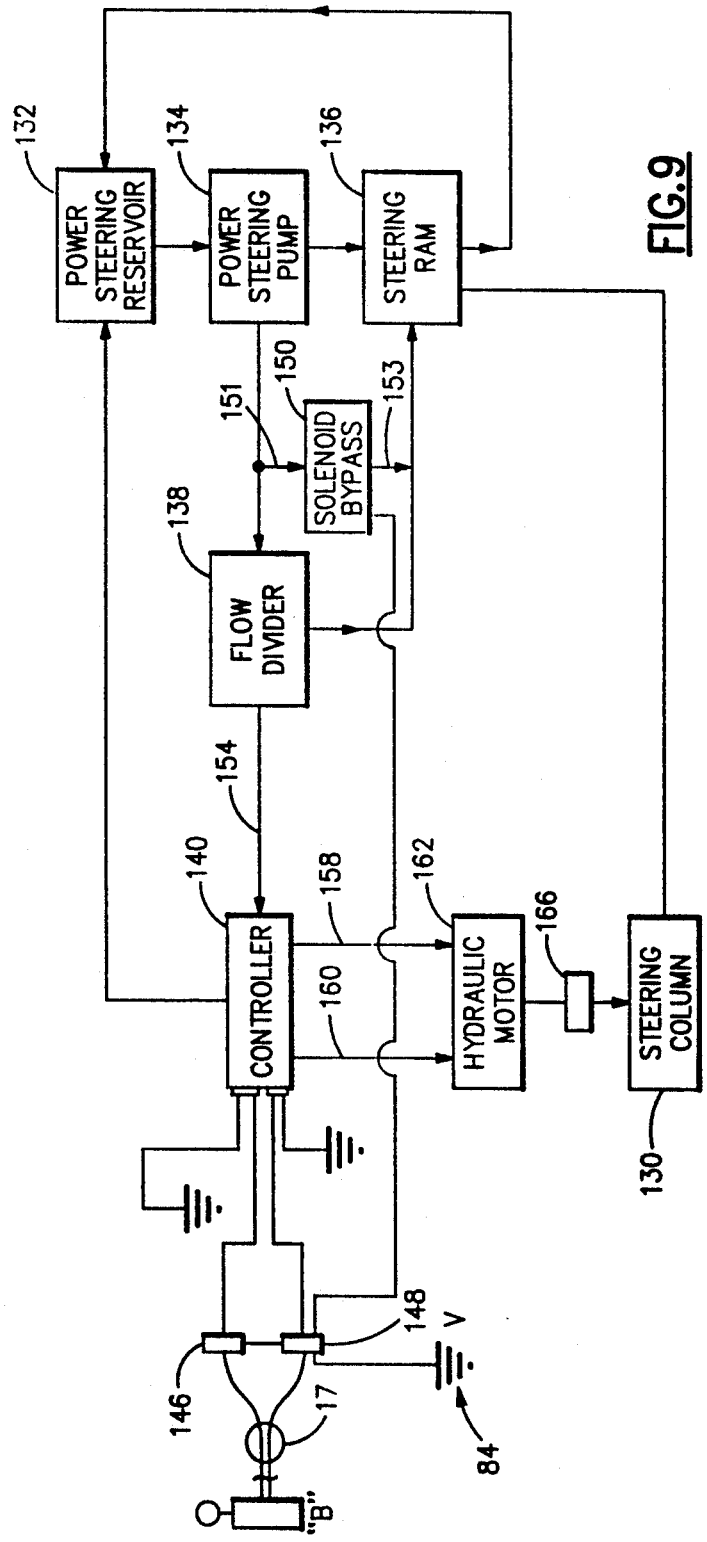

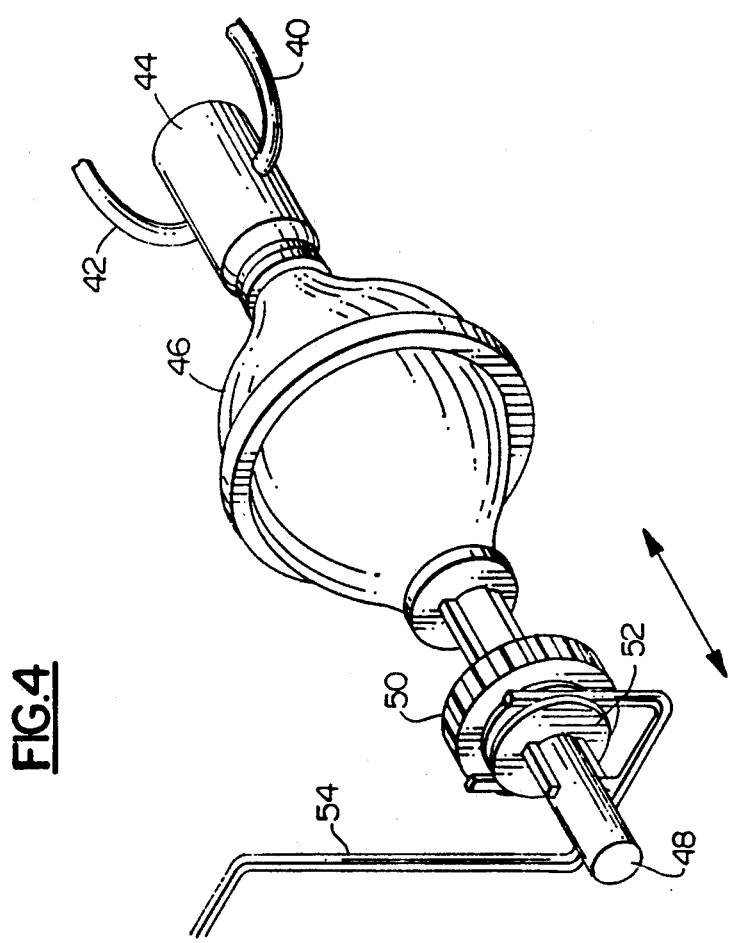

CARRIER/EXCAVATOR REMOTE OPERATING SYSTEM

BACKGROUND OF THE INVENTION

This invention relates to remote operating systems and, more particularly, to a system adapted for incorporation into a carrier vehicle and excavator combination which permits a worker in the cab of the excavator to remotely control the movement of the carrier vehicle on which the excavator is mounted for independent operation.

Heavy duty material handling equipment such as excavators having a large shovel at the distal end of a boom assembly are many times mounted for operation upon the back of a truck carrier. Both the truck carrier and the excavator have their own cabs in which workers are seated to independently operate the respective equipment. A worker drives the truck carrier over highway and individual job sites to position the excavator at the desired work location. With the truck carrier in place, either the same worker or a second worker proceeds to enter the excavator cab to operate the excavator which is rotatably mounted to the carrier through a center pin assembly.

Since it is often necessary to move the excavator about the job site via the truck carrier, different types of remote operating systems have been developed which permit the worker in the cab of the excavator to operate the truck carrier's movement, steering, braking, and throttle systems. This feature saves both time and money in that a second worker need not be available to enter the truck carrier cab to move it and the excavator. Also, if there isn't a second worker available, the first worker in the excavator cab need not exit his cab to enter the truck carrier cage to operate it.

The most favored remote operating system of the above type is one that is relatively simple in design and components to reduce the chance of breakdown, and one that may be incorporated into an existing carrier and excavator combination with a minimum of skill and effort. Many of the prior art remote control systems require a distinct power source and/or a series of complex (nd expensive) linkages between the excavator and carrier vehicle. For example, U.S. Pat. No. 3,599,814 issued to Brownfield on Aug. 17, 1971 discloses a remote operating system requiring an auxiliary engine mounted on the rotatable platform which operates the boom assembly. An auxiliary drive line interconnects the auxiliary engine to a fluid motor which is operable to transmit power from the auxiliary engine to the main drive line. The auxiliary drive line comprises fluid conduits which must be fed through the center pin assembly to deliver and recycle hydraulic fluid to and from the motor, respectively.

Other types of remote control systems which utilize hydraulic fluid traveling through conduits passing through the center pin assembly may be seen in U.S. Pat. No. 4,318,451 issued to Liggett on Mar. 9, 1982 and U.S. Pat. No. 2,959,260 issued to Johnson et al. on Nov. 8, 1960.

In U.S. Pat. No. 4,705,450 issued to Gano on Nov. 10, 1987, a hydraulic pump operates through a power take-off on the torque converter to provide fluid under pressure to a hydraulic drive motor which provides a secondary power input to the transmission. Fluid also travels via a second conduit through the center pin to provide hydraulic control for the upperstructure movable machinery components. While the Gano remote control system appears very useful for a carrier/excavator of the type not including a separate excavator engine, it would not be powerful enough to be installed upon the heavier carrier/excavators such as the GRADALL® 1000 series, for example. Furthermore, center pin assemblies which include means for the passage of fluid conduits therethrough are typically quite expensive.

SUMMARY OF THE INVENTION

It is a principal object of the present invention to provide a remote control system for a carrier/excavator combination which may be installed upon an existing carrier/excavator combination with a minimum of effort.

It is another object of the present invention to provide a remote control system for a carrier/excavator combination which does not require the passage of hydraulic conduits through the center pin assembly which rotatably connects and supports the excavator upon the carrier vehicle.

It is a further object of the present invention to provide a remote control system for a carrier/excavator combination which utilizes an efficient combination of electricity and hydraulics to control the movement, steering, braking, and throttle systems of the the carrier vehicle from the excavator cab.

It is yet a further object of the present invention to provide a remote control system for a carrier/excavator combination which does not use hydraulic fluid from the upper structure to operate, which use has shown to cause excessive heating and rapid breakdown of all hydraulic parts.

It is still a further object of the present invention to provide a remote control system for a carrier/excavator combination which is powerful enough to remotely operate the larger and heavier types of vehicles such as the GRADALL® 1000, for example.

It is yet another object of the present invention to provide a carrier/excavator remote control system which is relatively simple in design and therefore very economically attractive.

Other objects will in part be obvious and in part appear hereinafter.

In accordance with the foregoing objects, the invention comprises a remote control system for a truck carrier/excavator which can be easily incorporated into most carrier/excavator combinations in use today. The system permits an operator in the excavator cab to control the movement of the carrier on which the excavator is rotatably mounted for operation.

To control forward and reverse movement of the carrier from the excavator cab, a hydrostatic pump is operably connected to the distal end of a shaft mounted to the forward end of the crankshaft of the carrier engine. Electric control in the form of a joystick in the excavator cab electrically connects to the pump through wiring traveling from the joystick control through a slip ring on the center pin assembly which connects the excavator to the carrier. With the main clutch disengaged in the carrier cab and the carrier engine running, the pump may be started via the joystick in the excavator cab.

The pump operates by pumping hydraulic fluid from a reservoir tank through conduit to either side of a hydraulic motor. The hydraulic motor is operably connected to a gearbox with both the motor and gearbox mounted adjacent the carrier auxiliary transmission. Depending on whether forward or reverse motion is desired, the hydraulic fluid enters either the right or left side of the hydraulic motor, respectively, through appropriate movement of the joystick in the excavator cab. The hydraulic motor turns gears in the gearbox which rotate a splined shaft extending therefrom at a specific torque. A first drive gear is fixedly mounted to the carrier drive shaft adjacent the carrier auxiliary transmission. A second drive gear is telescopically and slidingly mounted to the splined shaft extending from the gearbox, this second gear being manually movable into and out of meshing engagement with the first gear on the drive shaft. When the gears are engaged, the rotational force from the gearbox shaft imparted thereto by the hydraulic motor and pump is transmitted to the carrier drive shaft thereby imparting motion to the drive wheels.

In second and third embodiments of the invention, the hydraulic motor is mounted to a power take-off on the main transmission and the auxiliary transmission, respectively, thereby eliminating the need for gears on the drive shaft.

Steering control of the carrier vehicle at the excavator cab is accomplished by manipulating a second joystick in the excavator cab which electrically connects to a controller in the carrier cab. To remotely control steering, a second hydraulic motor is mounted within the carrier cab and is operated by hydraulic fluid tapped from the carrier's power steering reservoir. The electric controller is operable to direct hydraulic fluid through either of two inlets on the hydraulic motor depending on whether a right or left turn is desired. A gear fixedly mounted to the steering column is turned by a chain trained over it and a second gear rotatably connected to the hydraulic motor. A clutch is provided to disengage the gears when steering at the carrier cab is desired.

In an alternate embodiment, hydraulic fluid is directed to the second hydraulic motor from a second pump attached to and powered by the hydrostatic pump attached to the carrier engine crankshaft, both pumps receiving hydraulic fluid from the same source.

To control carrier braking from the excavator cab, the same joystick which controls the steering described above is also electrically connected to an electric controller mounted to and in operable communication with the carrier air-brake lines. With the carrier brake pedal depressed and secured, air from the compressor is allowed to travel to the front and rear brakes to brake the carrier. When movement is desired, the electric controller is activated at the joystick to interrupt the airflow to the brakes and release them.

Control of the carrier throttle is achieved by a pull cable attached to the throttle at one end thereof and to an air actuated cylinder and piston at the other end thereof. A joystick in the excavator cab electrically connects to an air regulator which controls movement of the air cylinder and piston and hence the throttle.

BRIEF DESCRIPTION OF THE DRAWINGS

FIG. 3 is a block diagram of the remote driving components of the invention seen in FIGS. 1 and 2;

FIG. 4 is an enlarged, perspective view of the hydraulic motor and gearbox showing the drive gear and yoke assembly mounted upon the splined shaft extending from the gearbox;

FIG. 9 is a block diagram of the remote steering control system of FIG. 8;

DETAILED DESCRIPTION

Figure 1:
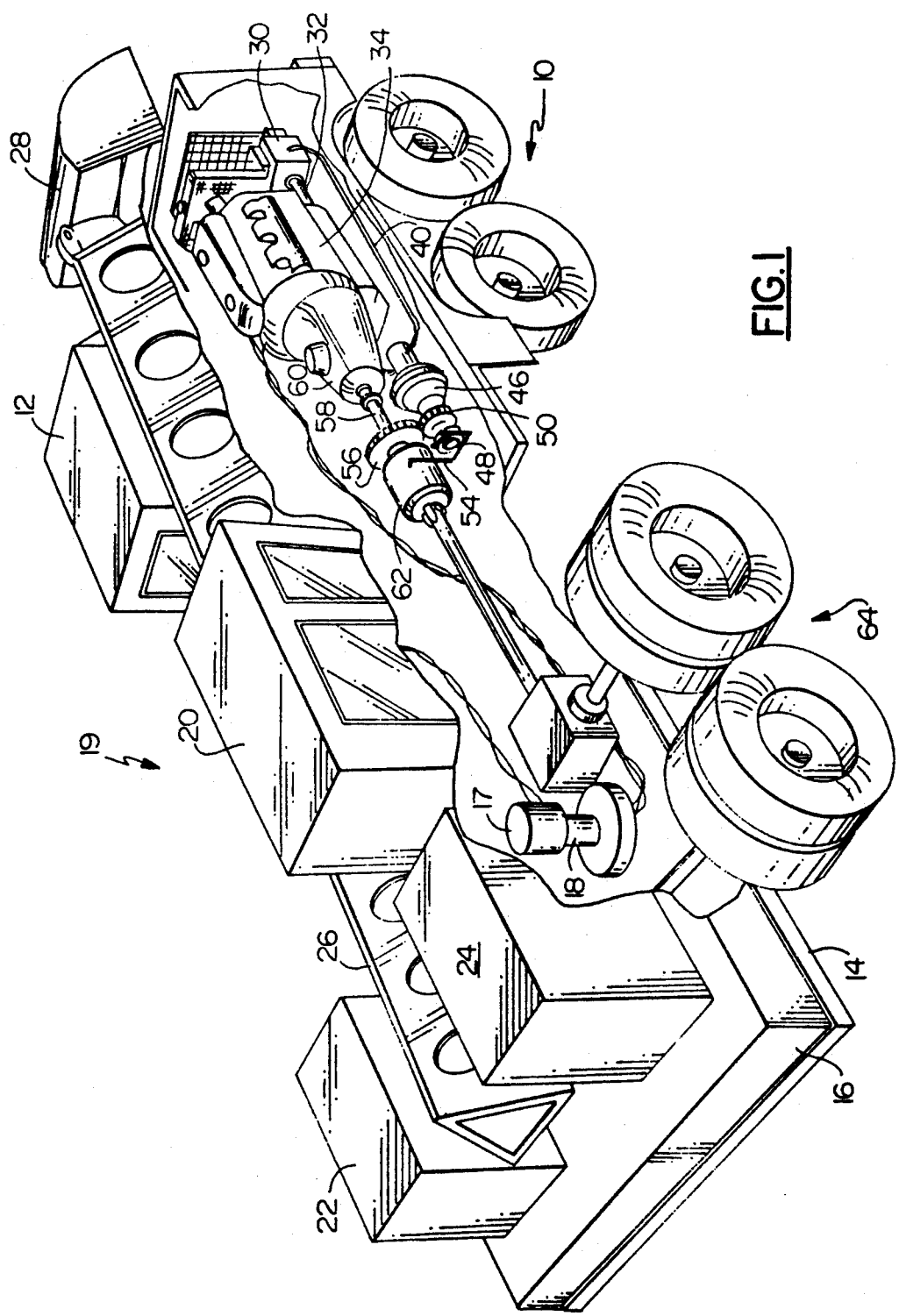
FIG. 1 is a perspective view of a truck carrier and excavator combination with portions thereof partly broken away to reveal the remote drive operating components of the invention incorporated therein.
Figure 2:
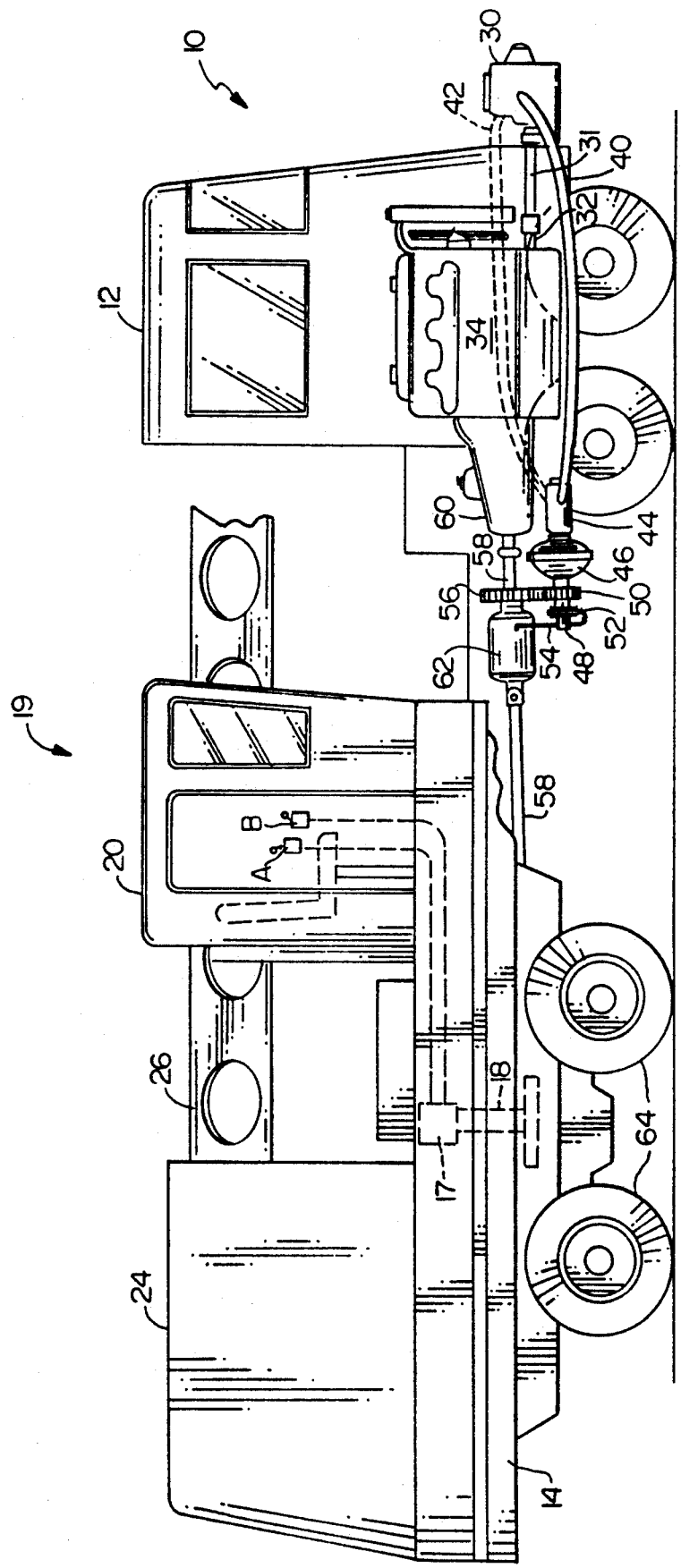
FIG. 2 is a side elevational view of FIG. 1.

Referring now to the drawings, there is seen in FIGS. 1 and 2 a truck carrier 10 having a carrier operator's cab 12 and a rear bed 14 on which a platform 16 is rotatably mounted via center pin assembly 18. An excavator 19 having an excavator operator's cab 20, engines 22 and 24, and boom 26 is mounted upon platform 16 such that it may operate independently and pivot with respect to truck carrier 10.

In normal operations, truck carrier 10 is driven over roads by an operator in carrier cab 12 to and from job sites. Once at a job site, carrier 10 is moved to position excavator 19 at the particular excavation work site. Once in position, truck 10 is braked and a worker in excavator cab 20 operates boom 26 and shovel 28 as required.

To obviate the need for separate operators in both carrier cab 12 and excavator cab 20, the invention comprises a control system by which remote operation of carrier 10 may be had by an operator situated in excavator cab 20. As such, the excavator operator may move carrier 10 about the job site without leaving excavator cab 20. It is intended, however, that long distance driving of carrier 10 over roads and highways still be conducted directly from carrier cab 12.

Referring still to FIGS. 1 and 2 and also to FIG. 3, the invention is seen to comprise a remote control assembly which may be installed on already existing carrier/excavator combinations in a relatively uncomplicated procedure. A hydrostatic pump 30 is operably mounted to a shaft 31 which is attached to the forward end of the crankshaft 32 of carrier engine 34. Pump 30 is a positive displacement pump having first and second chambers 31 and 33, respectively, and is supplied hydraulic fluid through conduit from a reservoir (source 175 seen in FIG. 3) which may be mounted to the frame of carrier 10. When carrier engine 34 is running, rotation of crankshaft 32 provides the mechanical input to run pump 30. Electric input, controlling valve actuation of pump 30, is provided via electric wires 36 and 38 (FIG. 3) which run along the frame of carrier 10, through a slip ring 17 attached to center pin assembly 18, to joystick A in excavator cab 20.

Two separate hydraulic conduit lines 40 and 42 extend between and interconnect pump 30 to a hydraulic motor 44 on opposite sides thereof. Movement of joystick A in excavator cab 20 in a first direction causes hydraulic fluid to be forced through conduit line 40 to motor 44 and return to pump 30 through conduit line 42. Motor 44 hence operates by turning gears in gearbox 46 in a first direction. Movement of joystick A in a second direction causes hydraulic fluid to travel in the opposite direction, i.e., from pump 30 through conduit line 42 to motor 44, and return to pump 30 through conduit line 40. Motor 44 here operates by turning gears in gearbox 46 in a second direction opposite to the first direction mentioned above.

Referring to FIG. 4, a splined shaft 48 is seen to extend from the end of gearbox 46 opposite motor 44. A drive gear 50 includes a grooved collar 52 fixedly attached thereto whereby a manually operable shifting yoke in the form of a two-pronged lever 54 may be used to axially slide gear 50 along shaft 48 by removably engaging the prongs of lever 54 in the groove of collar 52. Axial movement of gear 50 along shaft 48 permits gear 50 to be moved into and out of meshing engagement with a second gear 56 fixedly secured to drive shaft 58 extending from carrier transmission 60.

It is seen in FIGS. 1-3 that gear 56 is mounted to drive shaft 58 between transmission 60 and an auxiliary transmission 62. With gear 50 placed into meshing engagement with drive shaft gear 56, actuation of pump 30 and motor 44 causes rotation of gear 50 and hence drive shaft gear 56. With gear 56 in fixed engagement with carrier drive shaft 58, rotation is imparted to drive shaft 58 and ultimately to drive wheels 64. As described above, the direction of rotation of gearbox 46 and shaft 48 may be reversed by moving joystick A in the opposite direction. Remote forward and reverse movement of carrier vehicle 10 is thereby controlled at joystick A in excavator cab 20.

The present inventor has found that a gearbox such as gearbox 46 with a gear ratio of about 5:1 is best suited on carrier/excavators of the same or similar size and type as the GRADALL® 1000 series of carrier excavator. If a different size or type carrier/excavator is used, the gear ratio of the gearbox may be increased or decreased as the particular application requires. Drive gears 50 and 56 are preferably in the ten to twelve inch range but may also be sized as needed.

When it is desired to operate the remote drive assembly, the carrier main transmission 60 is set in neutral in the usual manner. The auxiliary transmission 62 may be set in low or high gear, low gear being usually selected for moving carrier 10 small distances as is the case with remote driving. To initially mesh gears 50 and 56, auxiliary transmission 62 is set in neutral and the portion of drive shaft 58 located forward of auxiliary transmission 62 is manually turned until gear 56 engages gear 50 which is moved axially along shaft 48 to a position adjacent gear 56 by shifting yoke 54 as previously described.

Figure 11A:
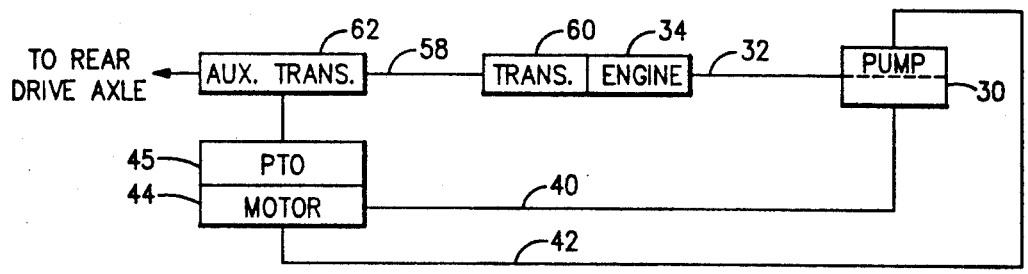
FIG. 11A is a block diagram of the hydraulic motor attached to a power take-off on the carrier main transmission in a second embodiment of the invention.
Figure 11B:
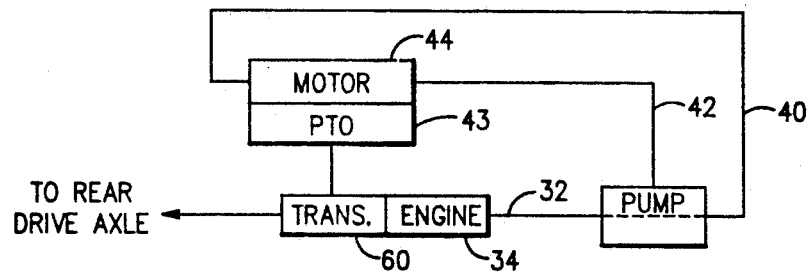
FIG. 11B is a block diagram of the hydraulic motor attached to a power take-off on the auxiliary transmission in a third embodiment of the invention.

Attention is turned to FIGS. 11A and 11B which show two distinct alternate embodiments of the remote driving control assembly of the invention. In a third embodiment shown in FIG. 11B, hydraulic motor 44 is mounted directly to a power take-off 43 on carrier transmission 60. In a second embodiment shown in FIG. 11A, hydraulic motor 44 is mounted directly to a power take-off 45 on auxiliary transmission 62. If neither the main transmission 60 nor auxiliary transmission 62 have a power take-off capability, the embodiment of FIGS. 1-3 discussed above would be utilized. The method of mounting a motor to a power take-off is generally well known in the art therefore eliminating the need to discuss it in any more detail herein.

Figure 5:
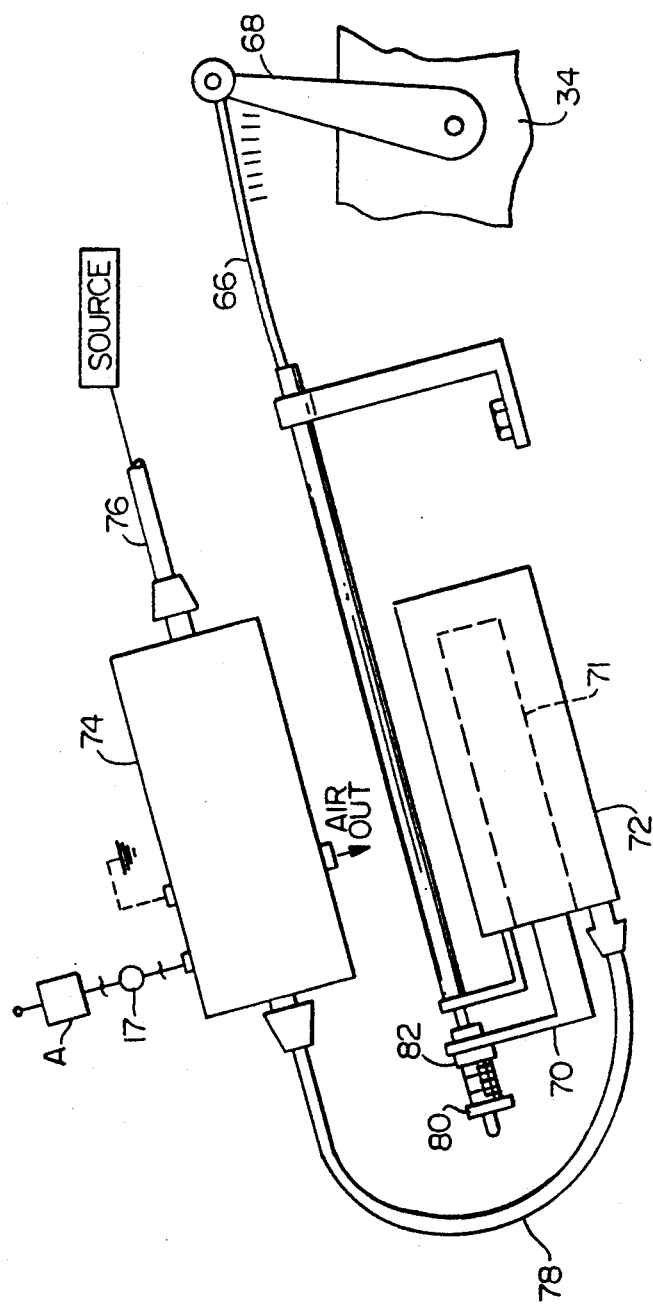
FIG. 5 is a side, elevational schematic view of the remote throttle control mechanism of the invention.

Referring to FIG. 5, remote control of the carrier engine's speed is accomplished by a pull cable 66 attached to the carrier engine throttle lever 68 at one end thereof and to an arm 70 extending from a pneumatic piston 71 and cylinder 72 at the opposite end thereof. Joystick A in excavator cab 20 electrically connects to air regulator 74 to control operation thereof. Compressed air is supplied to regulator 74 via air line 76, the source of compressed air being simply labeled "source". Manipulation of joystick A in either the first or second direction mentioned above causes regulator 74 to open and allow the compressed air to pass through air line 78 to pneumatic cylinder 72. The compressed air delivered to cylinder 72 moves piston 71 contained therein which thereby pushes attached arm 70 in a direction away from cylinder 72. Cable 66 is therefore pulled toward arm 70 which moves throttle 68 to increase engine speed as desired. An adjustment screw 80 with lock nut 82 is provided on arm 70 to adjust cable 66 as needed. Piston 71 is appropriately biased to move lever 66 in the opposite direction when joystick A is moved to a neutral position thereby decreasing engine speed.

Means are provided in excavator cab 20 to remotely activate a toggle switch 82 is mounted within excavator cab 20, switch 82 connecting to the carrier battery 84 via ignition switch 86 and also to a second air regulator 88 which is used to selectively pull an engine kill lever 90 which may be found on some diesel engines.

Ignition switch 86 is mounted within excavator cab 20 and may be turned to the "on" position which starts carrier engine 34 via starter 92 and which supplies joysticks A and B power from carrier battery 84. Carrier engine 34 may thus be started from either carrier cab 12 or excavator cab 20.

Referring back to the kill lever 90, it is seen that the control system is substantially the same as the control system for throttle 68. Pushing toggle switch 82 to the "closed" position completes a circuit from carrier battery 84 which activates air regulator 88. Compressed air is forced through air line 94, directed into and through air line 96 and into pneumatic cylinder 98. A piston 97 inside cylinder 98 forces arm 100 in a direction away from cylinder 98. Attached cable 102 is pulled by arm 100 through sleeve 104 which pulls kill lever 90 and immediately shuts off carrier engine 34. Piston 97 is biased as is piston 71 such that it moves arm 100 in the opposite direction (and thus lever 90) when not receiving compressed air from regulator 88. This occurs when toggle switch 82 is moved to the "open" position which closes the valve in regulator 88 and vents the air through the outlet.

Figure 7:
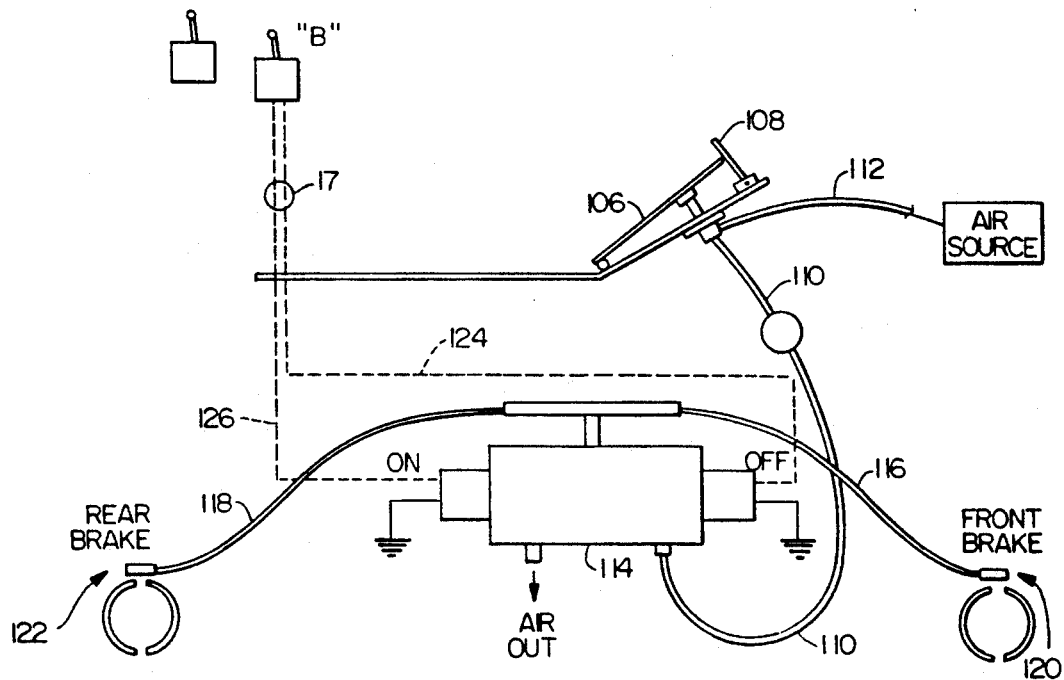
FIG. 7 is a side, elevational view of the remote braking mechanism of the invention.
Figure 6:
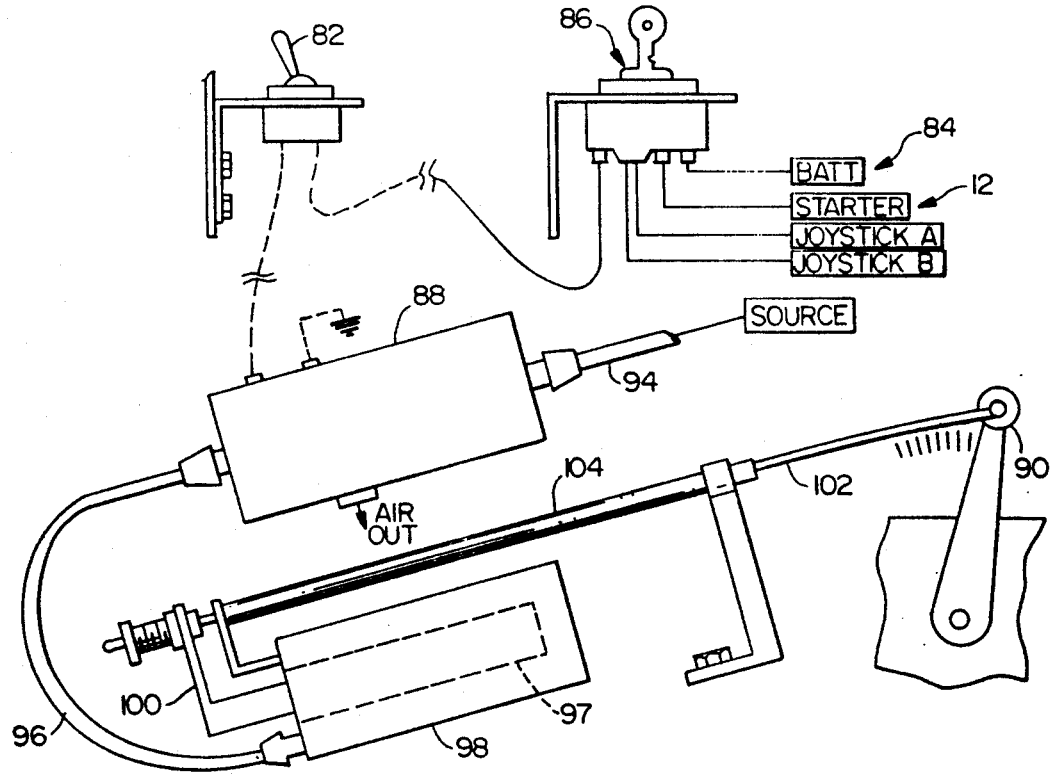
FIG. 6 is a side, elevational schematic view of the engine kill lever remote control system of the invention.

Turning attention to FIG. 7 which schematically shows the remote braking system of the invention, the carrier brake pedal 106 is depressed and secured by lock lever 108. In the depressed position, compressed air is fed into brake air line 110 from line 112 which is attached to a source of compressed air existing on all vehicles employing an air brake system. An air regulator 114 is attached to air line 110 and includes conduit feeds 116 and 118 leading to the front and rear carrier brakes 120 and 122, respectively. With carrier brake pedal 106 depressed and secured, air travels through regulator 114 to the front and rear brakes 120 and 122 thereby braking carrier vehicle 10. When movement of carrier 10 is desired, joystick B in excavator cab 20 is moved in a first direction which closes regulator 114 via electric wire 124 thereby preventing air from entering lines 116 and 118 and releasing brakes 120 and 122, respectively. To brake carrier 10, joystick B is moved in a second direction opposite to the first direction which Opens regulator 114 via electric wire 126 thereby allowing air to enter lines 116 and 118 to activate brakes 120 and 122. It will be noticed that wires 124 and 126 which extend and electrically connect joystick B to air regulator 114 also travel through slip ring 17 in center pin assembly 18.

Figure 8:
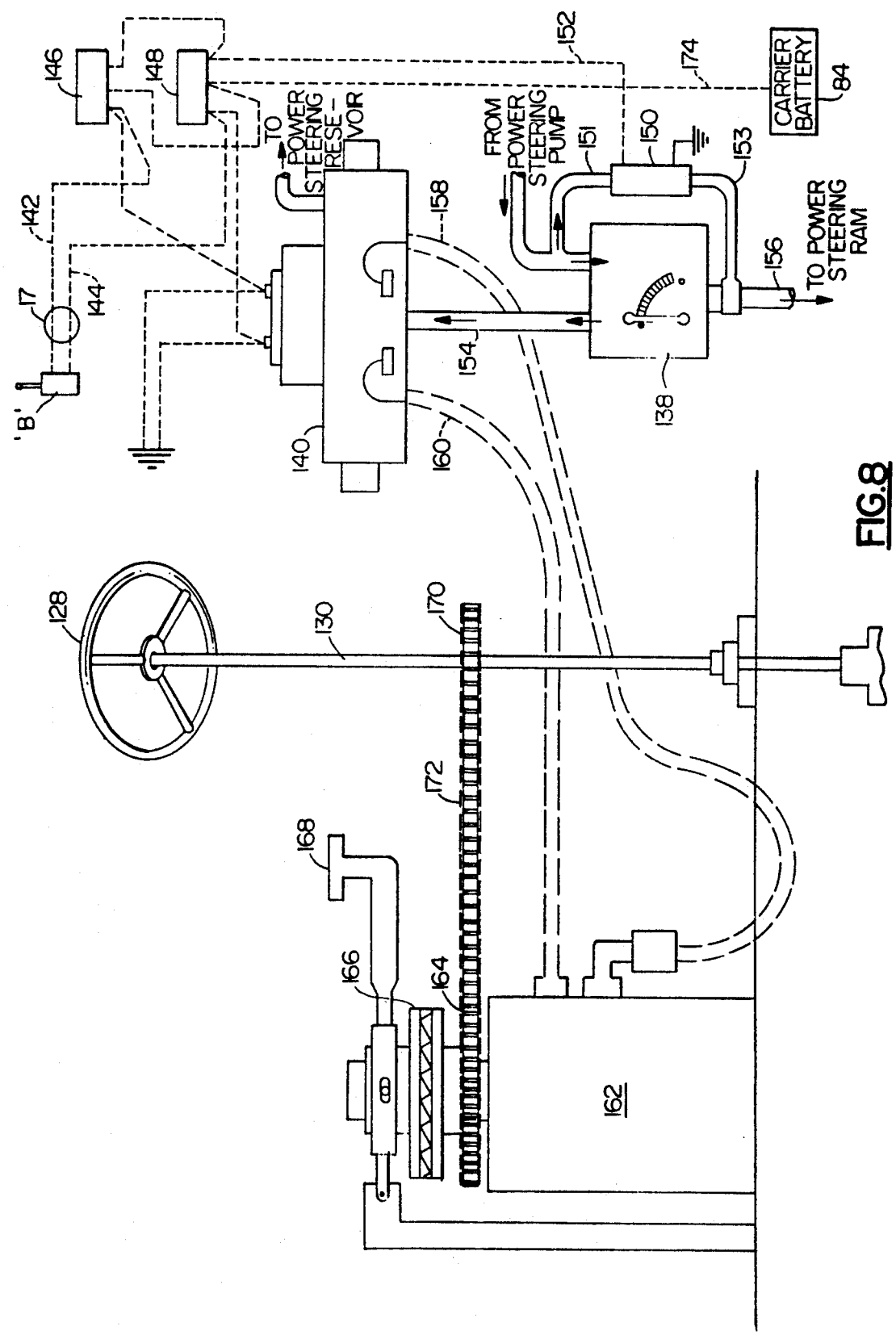
FIG. 8 is a schematic view of the remote steering control system of the invention.

Referring now to FIGS. 8 and 9 which show the remote steering system of the invention, the carrier cab 12 includes a conventional steering wheel 128 mounted to a steering column 130. The conventional power steering system includes a power steering fluid reservoir 132 which feeds the steering fluid to the power steering pump 134. Pump 134 pumps the steering fluid to the power steering ram 136 which operably connects to the steering column 130 through a gearbox assembly (not shown) permitting power steering control of wheel 128.

The remote steering system of the invention includes a flow divider 138 which operates by tapping power steering fluid from power steering pump 134 and diverting it to an electric controller 140. Controller 140 is actuated at joystick B in excavator cab 20 by wires 142 and 144 which attach to electric relays 146 and 148 (see FIG. 8). A solenoid switch 150 is provided to divert the flow of steering fluid from pump 134 to the steering ram 136 via fluid conduits 151 and 153 when remote steering is not activated. This feature avoids excessive heating of the steering fluid b bypassing flow divider 138 when remote steering is not in use. Hence, when joystick B is in the neutral position, solenoid switch 150 is in the open position. When joystick B is moved in either the right or left positions, solenoid switch 150 closes via electric wire 152 and steering fluid is forced through flow divider 138 to electric controller 140 via fluid conduit 154. The remaining steering fluid travels from flow divider 138 to power steering ram 136 via fluid conduit 156.

Two fluid conduits 158 and 160 attach to and extend from controller 140 and attach to hydraulic motor 162 at opposite ends thereof. Motor 162 is mounted for operation within carrier cab 12 adjacent steering column 130. Motor 162 is seen to include a gear 164 and clutch 166 having a lever 168 for manual manipulation thereof. A split gear 170 is fixedly mounted about steering column 130 and a chain 172 is trained over it and gear 164 on motor 162.

If a right turn is desired, joystick B (which is supplied power from the carrier battery 84 via electric wire 174) is moved to the right which activates controller 140 to open a valve located therein which directs steering fluid through fluid conduit 158 to motor 162. Motor 162 is thus operated by the steering fluid to turn gear 164 in a first direction causing column 130 to turn right via chain 172 and gear 170. If a left turn is desired, joystick B is moved to the left which causes controller 140 to open the valve directing steering fluid through conduit line 160 which operates motor 162 to turn gear 164 in the opposite direction thereby causing steering column 130 to turn wheel 128 to the left. When direct steering at carrier cab 20 is desired, clutch 166 is disengaged by manually pulling on clutch lever 168.

Figure 10:
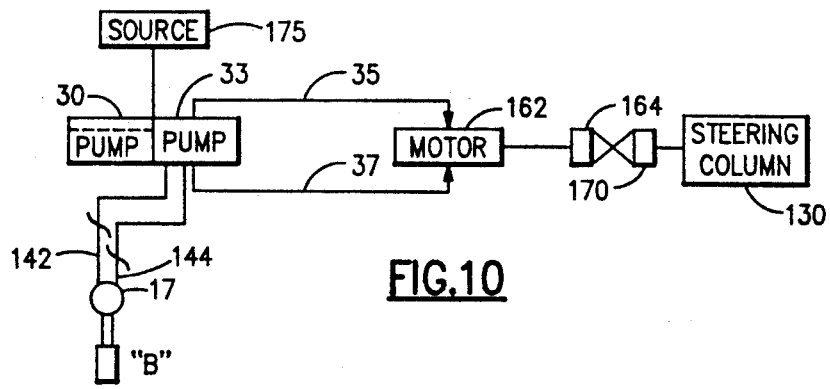
FIG. 10 is a block diagram illustrating an alternate embodiment of the remote steering mechanism of the invention.

Attention is turned to FIG. 10 which shows an alternate embodiment of the remote steering mechanism of the invention. Rather than tapping into the power steering fluid reservoir 132 which requires the use of a flow divider and electric controller as discussed above, a second pump 33 is mounted for operation upon hydrostatic pump 30, both receiving hydraulic fluid from the same source 175. Instead of electric wires 142 and 144 connecting to electric controller 140 as in the embodiment of FIGS. 8 and 9, joystick B and wires 142 and 144 connect to and operate pump 33. Pump 33 operates via joystick B by directing fluid through either conduit 35 or 37 to operate motor 162 in first or second directions, respectively, depending on whether a right- or left-hand turn is desired, respectively.

It is intended that the present invention not be limited to the application presented herein, i.e., to a carrier vehicle/excavator combination. The invention could be incorporated into any vehicle requiring remote operation of its moving, steering, braking, and throttle functions. An example of such a vehicle would be a cement mixer vehicle where it would be useful for the operator to exit the cab and remotely move the vehicle to the appropriate position for dispensing of the cement. Instead of the joysticks being located in a separate cab as with the carrier/excavator embodiment discussed above, the joystick controls would be available to the worker at a location external to the vehicle where the worker could walk about the vehicle while holding and manipulating the joysticks as needed.

The inventor is aware that many present day cement mixers employ a pump at the front of the vehicle's engine to drive a motor which turns the mixer. The present remote operating system requires a hydrostatic pump which can selectively direct fluid through either of two conduits leading to the motor as described heretofore.

Figure 12:
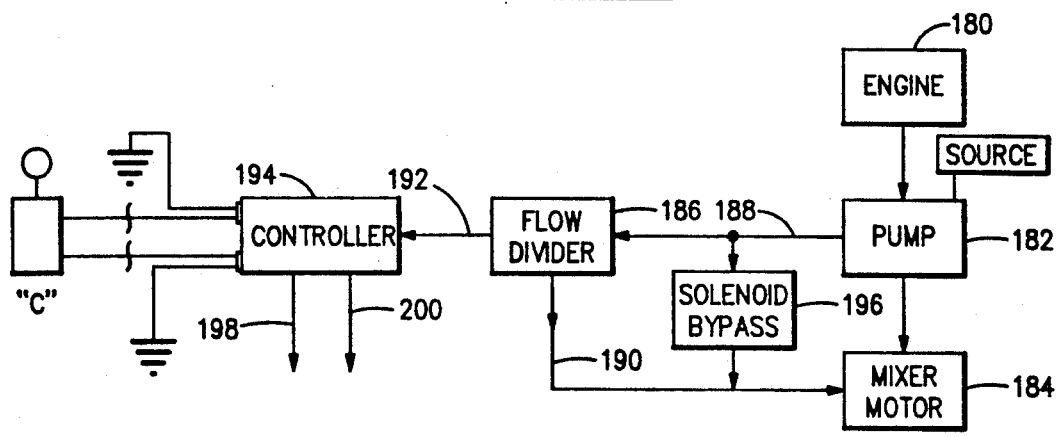
FIG. 12 is a block diagram of an embodiment of the invention adapted to remotely control a cement mixer vehicle.

If the cement mixer vehicle's pump is not of this type, then either a hydrostatic pump could be mounted thereto or a flow divider and electric controller could be used in the same manner as flow divider 138 and controller 140 selectively direct power steering fluid from pump 134 and through conduits 158 and 160 to motor 162 (FIG. 9). Thus, as seen in FIG. 12, a cement mixer vehicle engine 180 has a pump 182 mounted thereto which runs the mixer motor 184 which turns the mixer containing the cement. A flow divider 186 is attached to pump 182 via conduit 188 to receive fluid therefrom. Flow divider 186 directs fluid received from pump 182 through a first conduit 190 which leads back to mixer motor 184, and a second conduit 192 which leads to an electric controller 194. A solenoid bypass 196 is provided between divider 186 and pump 182 to direct fluid away from flow divider 186 and to mixer motor 184 when the remote control system is not in use.

Electric controller 194 is operated by a joystick C electrically connected thereto. Joystick C is operable to selectively direct fluid through either conduit 198 or 200 depending on which direction of moment of the vehicle is desired. Conduits 198 and 200 are attached at opposite ends thereof to either one of the implements which constitute the mechanical drive input to the vehicle to provide movement thereof. That is to say, controller conduits 198 and 200 may be either attached to a motor mounted to a power take-off on the vehicle's transmission (see FIG. 11), or to motor and gearbox assembly which turn meshing drive gears on the vehicle's drive shaft (see FIG. 3). It may be appreciated, therefore, that the present invention may be easily incorporated and adapted to a variety of heavy vehicles which would benefit from a remote control system.

What is claimed is:

1. Remote control apparatus for a combination of a carrier vehicle and an excavator in which said excavator is rotatably mounted for operation upon said carrier vehicle via a center pin assembly, said excavator including an excavator cab wherein an operator controls implement functions of said excavator, said carrier vehicle including a carrier cab wherein an operator directly controls speed, steering, and braking of said carrier vehicle over road and highway, said carrier vehicle having surface-engaging drive wheels movable by a carrier engine having a throttle, a crankshaft, a main transmission, and a drive shaft connecting and transferring power from said main transmission to said drive wheels, said drive shaft having a central, longitudinal axis and an auxiliary transmission mounted thereto at a location between said drive wheels and said main transmission, said remote control apparatus providing control of said speed, said steering, and said braking of said carrier vehicle from said excavator cab, said apparatus comprising, in combination:

a) a first fluid pump having first and second chambers operably connected to said crankshaft opposite a connection of said crankshaft to said main transmission, said crankshaft imparting mechanical operation to said pump when said carrier engine is operating, said first and second chambers of said pump receiving fluid from a source;

b) first and second fluid conduits having opposite first and second ends, said first and second fluid conduits being attached at said first ends of each to said first and second chambers of said pump, respectively;

c) a first hydraulic motor mounted to said carrier vehicle with said second ends of said first and second fluid conduits being attached to said first motor whereby said pump is in fluid communication with said first motor via said first and second conduits, said pump including first electric conducting means extending from said pump to said excavator cab through said center pin assembly;

d) first electric control means located in said excavator cab and electrically connected to said first electric conducting means, said first electric control means manually movable to first, second, and neutral positions whereby moving said first electric control means to said first position pumps said fluid from said first chamber of said pump, through said first conduit, and through said first motor, said fluid returning to said pump through said second conduit, and whereby moving said first electric control means to said second position pumps said fluid from said second chamber of said pump, through said second conduit, and through said first motor, said fluid returning to said pump through said first conduit, said first motor operating in a first motor direction in response to said fluid pumped therethrough by said pump from said first conduit, and said first motor operating in a second motor direction opposite to said first motor direction in response to said fluid pumped therethrough by said pump from said second conduit;

e) a gear shaft having a central, longitudinal axis connected to and powered by said first motor, said gear shaft rotating about said gear shaft axis in a first shaft direction in response to said motor operating in said first motor direction, said gear shaft rotating about said gear shaft axis in a second, opposite shaft direction in response to said motor operating in said second motor direction, said gear shaft axis being substantially parallel to and laterally offset from said drive shaft axis;

f) a first drive gear mounted to and rotatable with said gear shaft;

g) a second drive gear fixedly mounted to and rotatable with said carrier drive shaft adjacent said auxiliary transmission in a location between said main transmission and said auxiliary transmission, said first drive gear axially movable along said gear shaft to bring said first drive gear into and out of meshing engagement with said second drive gear, said meshing engagement being required for remote movement of said carrier vehicle from said excavator cab where said first and second drive gears rotate said drive shaft in said first shaft direction in response to said motor operating in said first motor direction and where said first and second drive gears rotate said drive shaft in said second, opposite shaft direction in response to said motor operating in said second motor direction;

h) means for remotely controlling said steering of said carrier vehicle from said excavator cab;

i) means for remotely controlling said throttle of said carrier vehicle from said excavator cab; and j) means for remotely controlling said braking of said carrier vehicle from said excavator cab.

2. The invention according to claim 1 further comprising a gearbox connected to and between said first motor and said gear shaft, said gearbox having a predetermined gear ratio rotating said gear shaft at a respective, predetermined torque in response to operation of said first motor by said pump.

3. The invention according to claim 1 wherein said pump is a hydrostatic pump.

4. The invention according to claim 1 wherein said carrier vehicle further includes a steering wheel mounted upon a steering column located in said carrier cab, said steering column drivingly connected to a power steering system including a power steering fluid reservoir, a power steering pump, and a power steering ram all in combination providing power steering control to said steering wheel and said steering column, and wherein said means for remotely controlling said steering of said carrier vehicle comprises, in combination:

a) a second hydraulic motor mounted in said carrier cab adjacent said steering column including a first steering gear rotatably mounted to said second hydraulic motor and driven thereby;

b) a second steering gear fixedly mounted to said steering column and rotatable therewith;

c) an endless chain trained over said first and second steering gears;

d) a clutch connected to said second motor, said clutch being selectively actuable to engage and disengage said first steering ear from said second motor;

e) a flow divider connected to and in fluid communication with said power steering pump, said flow divider operable to direct power steering fluid received from said power steering pump through first and second flow divider conduits, said first flow divider conduit connected to said power steering ram opposite a connection of said first flow divider conduit to said flow divider;
- f) an electric controller connected to said second flow divider conduit opposite a connection of said second flow divider conduit to said flow divider, said electric controller receiving said power steering fluid from said second flow divider conduit, said electric controller including first and second electric controller conduits connected thereto at first ends of each and connected to said second hydraulic motor at second ends of each, said controller being selectively operable to direct said power steering fluid through either one of said first and second electric controller conduits which thereby operates said second hydraulic motor in first and second directions, respectively, and which thereby rotates said first steering gear in first and second directions, respectively, said power steering fluid circulating through said second motor and back to said controller through the opposite one of said either one of said first and second electric controller conduits, said electric controller further including a third electric controller conduit connected thereto, said third electric controller conduit directing said power steering fluid from said opposite one of said first and second electric controller conduits to said power steering reservoir, said electric controller further including second electric conducting means extending from said controller to said excavator cab through said center pin assembly; and
- g) second electric control means located in said excavator cab and electrically connected to said second electric conducting means, said second electric control means manually movable to first and second control means positions whereby moving said second electric control means to said first control means position causes said controller to direct said power steering fluid through said either one of said first and second electric controller conduits, and whereby moving said second electric control means to said second control means position causes said electric controller to direct said power steering fluid through said opposite one of said first and second electric controller conduits.

5. The invention according to claim 4 wherein said means for remotely controlling said steering of said carrier vehicle further comprises a solenoid valve connected to and between said power steering pump and said power steering ram, said solenoid being selectively actuable at said excavator cab to direct said power steering fluid from said power steering pump to said power steering ram, said power steering fluid thereby bypassing said flow divider.

6. The invention according to claim 1 wherein said means for remotely controlling said throttle of said carrier engine comprises:
- a) an air regulator including first and second conduits, said air regulator receiving compressed air from a source through said regulator first conduit, said air regulator further including second electric conducting means extending from said air regulator to said excavator cab through said center pin assembly and attaching to said first electric control means whereby movement of said first electric control means in either said first or second positions actuates said air regulator to send said compressed air through said regulator second conduit, said air regulator including an air outlet wherethrough said compressed air is vented when said first electric control means is moved to said neutral position;
- b) a pneumatic piston and cylinder assembly connected to said regulator second conduit and positioned to receive said compressed air therefrom, a piston of said assembly including a rigid arm attached and extending therefrom, said arm being movable in a first arm direction in response to said piston and cylinder assembly receiving said compressed air from said regulator second conduit, said piston being biased in a second, opposite direction in response to said venting of said regulator whereby said arm moves in an opposite, second arm direction, respectively; and
- c) a pull cable attached to said throttle at a first end thereof and to said arm at a second, opposite end thereof whereby said pull cable moves said throttle in first and second directions in response to said arm moving in said first and second arm directions, respectively.

7. The invention according to claim 1 wherein said carrier vehicle further includes front and rear brakes and an air brake system having a source of compressed air connected to a brake pedal in said carrier cab, said pedal being movable to a depressed position to activate said brakes, and wherein said means for remotely controlling said braking of said carrie vehicle comprises:
- a) an air regulator attached to said brake pedal via a first brake air line and positioned to receive said compressed air therefrom when said brake is moved to said depressed position, said air regulator further including second electric conducting means extending from said air regulator to said excavator cab through said center pin assembly; and
- b) second electric control means located in said excavator cab and electrically connected to said second electric conducting means, said second electric control means manually movable to first and second positions whereby moving said second electric control means to said first position of said second electric control means causes said air regulator to direct said compressed air from said depressed brake pedal to said brakes, and whereby moving said second electric control means to said second position of said second electric control means causes said regulator to prevent said compressed air from reaching and activating said brakes.

8. The invention according to claim 1 wherein said carrier engine is supplied power from a carrier battery and a starter and wherein said apparatus further comprises an ignition mounted in said excavator cab including second and third electric conducting means extending from said ignition to said carrier battery and said starter, respectively, and further including fourth electric conducting means extending from said ignition to said first electric control means whereby said carrier engine may be started by manual actuation of said ignition and said first electric control means is supplied electricity from said carrier battery via said ignition.

9. The invention according to claim 8 wherein said carrier engine includes a kill lever and said remote control apparatus further comprises:

a) an air regulator having an inlet port, an outlet port, and an exhaust port, said regulator receiving a source of compressed air through said inlet port;

b) a pneumatic piston and cylinder assembly connected to said air regulator outlet port and operated in response to said compressed air received therefrom, a piston of said assembly including a rigid arm extending therefrom, said rigid arm attached to a first end of a pull cable, a second, opposite end of said pull cable being attached to said kill lever; and c) a toggle switch attached to fifth electric conducting means extending from said ignition to said air regulator, said switch being movable between open and closed positions whereby said closed position operates said air regulator by directing said compressed air to said assembly which moves said pneumatic piston and said rigid arm to pull said cable and said kill lever in a direction shutting off said carrier engine.

10. The invention according to claim 1 wherein said carrier vehicle further includes a steering wheel mounted upon a steering column located in said carrier cab, and wherein said means for remotely controlling said steering of said carrier vehicle comprises:

a) a second hydraulic motor mounted in said carrier cab adjacent said steering column including a first steering gear rotatably mounted to said second hydraulic motor and driven thereby;

b) a second steering gear fixedly mounted to said steering column and rotatable therewith;

c) an endless chain trained over said first and second steering gears;

d) a clutch connected to said second motor, said clutch being selectively actuable to engage and disengage said first steering gear from said second motor;

e) a second fluid pump connected to and receiving mechanical input from said first fluid pump, said second fluid pump having first and second chambers and receiving said fluid from said source, said second pump including second electric conducting means extending therefrom to said excavator cab through said center pin assembly;

f) third and fourth fluid conduits attached at first ends of each to said first and second chambers of said second pump, respectively, and to said second hydraulic motor at second ends of each, said second pump including means to reverse flow of said fluid between said second pump first and second chambers; and g) second electric control means located in said excavator cab and electrically connected to said second electric conducting means, said second electric control means manually movable to first and second positions whereby moving said second electric control means to said first position of said second electric control means causes said second pump to pump said fluid through either one of said third and fourth conduits thereby operating said second hydraulic motor and said first and second steering gears in a first rotational direction, and whereby moving said second electric control means to said second position of said second electric control means causes said second pump to pump said fluid through the opposite of said either one of said third and fourth conduits thereby operating said second hydraulic motor and said first and second steering gears in a second, opposite rotational direction.

11. Apparatus providing remote control of movement, steering, braking, and throttle functions of a vehicle having surface-engaging drive wheels movable by a vehicle engine having a throttle, a crankshaft, a main transmission, and a drive shaft connecting and transferring power from said main transmission to said drive wheels, said vehicle including a cab wherein an operator directly controls a speed, said steering function, and said braking function of said vehicle over road and highway, said remote control apparatus providing control of said speed, said steering function, and said braking function of said vehicle from a location remote from said vehicle cab, said apparatus comprising:

a) a fluid pump having first and second chambers operably connected to said engine crankshaft opposite a connection thereof to said main transmission, said crankshaft imparting mechanical operation to said pump when said vehicle engine is operating, said pump receiving fluid from a source;

b) first and second fluid conduits having opposite first and second ends, said first and second fluid conduits being attached at said first ends of each to said first and second chambers of said pump, respectively;

c) a power take-off mounted to said main transmission;

d) a first hydraulic motor mounted to said power take-off with said second ends of said first and second fluid conduits being attached to said first motor whereby said pump is in fluid communication with said first motor via said first and second conduits, said first motor providing mechanical input to said main transmission through said power take-off, said pump including first electric conducting means extending from said pump to said remote location;

e) first electric control means positioned at a location external to said vehicle cab and electrically connected to said first electric conducting means, said first electric control means manually movable to first, second, and neutral positions whereby moving said first electric control means to said first position pumps said fluid from said first pump chamber, through said first conduit, and through said first motor, said fluid returning to said pump through said second conduit, and whereby moving said first electric control means to said second position pumps said fluid from said second chamber, through said second conduit, and through said first motor, said fluid returning to said pump through said first conduit, said first motor operating in a first direction in response to said fluid pumped therethrough by said pump from said first conduit, and said first motor operating in a second direction opposite to said first direction in response to said fluid pumped therethrough by said pump from said second conduit;

f) means for remotely controlling said steering function of said vehicle from said remote location;

g) means for remotely controlling said throttle of said vehicle engine from said remote location; and h) means for remotely controlling said braking function of said vehicle from said remote location.

12. Apparatus providing remote control of movement, steering, braking, and throttle functions of a vehicle having surface-engaging drive wheels movable by a vehicle engine having a throttle, a crankshaft, a main transmission, and a drive shaft connecting and transferring power from said main transmission to said drive wheels, said vehicle including an auxiliary transmission mounted to said drive shaft at a location between said drive wheels and said main transmission, said vehicle including a cab wherein an operator directly controls a speed, said steering function, and said braking function of said vehicle over road and highway, said remote control apparatus providing control of said speed, said steering function, and said braking function of said vehicle from a location remote from said vehicle cab, said apparatus comprising:

a) a fluid pump having first and second chambers operably connected to said engine crankshaft opposite, a connection thereof to said main transmission, said crankshaft imparting mechanical operation to said pump when said vehicle engine is operating, said pump receiving fluid from a source;

b) first and second fluid conduits having first and second opposite ends, said first and second fluid conduits being attached at said first ends of each to said first and second chambers of said pump, respectively;

c) a power take-off mounted to said auxiliary transmission;

d) a first hydraulic motor mounted to said power take-off with said second ends of said first and second fluid conduits being attached to said first motor whereby said pump is in fluid communication with said first motor via said first and second conduits, said first motor providing mechanical input to said auxiliary transmission through said power take-off, said pump including first electric conducting means extending from said pump to said remote location;

e) first electric control means positioned at a location external to said vehicle cab and electrically connected to said first electric conducting means, said first electric control means manually movable to first, second, and neutral positions whereby moving said first electric control means to said first position pumps said fluid from said first pump chamber, through said first conduit, and through said first motor, said fluid returning to said pump through said second conduit, and whereby moving said first electric control means to said second position pumps said fluid from said second chamber, through said second conduit, and through said first motor, said fluid returning to said pump through said first conduit, said first motor operating in a first direction in response to said fluid pumped therethrough by said pump from said first conduit, and said first motor operating in a second direction opposite to said first direction in response to said fluid pumped therethrough by said pump from said second conduit;

f) means for remotely controlling said steering function of said vehicle from said remote location;

g) means for remotely controlling said throttle of said vehicle engine from said remote location; and h) means for remotely controlling said braking function of said vehicle from said remote location.

13. Apparatus providing remote control of movement, steering, braking, and throttle functions of a vehicle having surface-engaging drive wheels movable by a vehicle engine having a throttle, a crankshaft, a main transmission, and a drive shaft connecting and transferring power from said main transmission to said drive wheels, said vehicle including a cab wherein an operator directly controls a speed, said steering function, and said braking function of said vehicle from a location remote from said vehicle cab, said apparatus comprising:

a) a fluid pump operably connected to said engine crankshaft opposite a connection thereof to said main transmission, said crankshaft imparting mechanical operation to said pump when said vehicle engine is operating, said pump receiving fluid from a source;

b) a flow divider connected to said pump and receiving said fluid therefrom;

c) an electric controller connected to said flow divider and receiving said fluid therefrom, said controller including first and second fluid conduits and means selectively directing said fluid through either one of said first and second conduits, said controller including electric conducting means extending therefrom to said remote location;

d) a motor providing mechanical input to rotate said drive shaft in first and second, opposite shaft directions, said first and second conduits connected to said motor at ends thereof opposite a connection thereof to said electric controller;

e) electric control means connected to said electric conducting means and movable to first and second positions whereby moving said control means to said first position causes said electric controller to direct said fluid through said either one of said first and second conduits to said motor with said fluid returning to said electric controller through the opposite one of said either one of said first and second conduits, and whereby moving said control means to said second position causes said electric controller to direct said fluid through said opposite one of said first and second conduits to said motor with said fluid returning to said electric controller through said either one of said first and second conduits, said motor thereby operating in a first motor direction in response to said fluid received from said controller through said either one of said first and second conduits and said motor operating in a second motor direction opposite to said first motor direction in response to said fluid received from said opposite one of said first and second conduits, said motor thereby operable to rotate said drive shaft in said first and second shaft directions;

f) means for remotely controlling said steering function of said vehicle from said remote location;

g) means for remotely controlling said throttle of said vehicle engine from said remote location; and h) means for remotely controlling said braking function of said vehicle from said remote location.

14. The invention according to claim 13 wherein said transmission includes a power take-off and said motor is mounted to said power take-off to provide said mechanical input to said drive shaft through said transmission.

15. The invention according to claim 13 wherein said vehicle further includes an auxiliary transmission with a power take-off mounted on said drive shaft and said motor is mounted to said power take-off to provide said mechanical input to said drive shaft through said auxiliary transmission.

16. The invention according to claim 13 wherein said drive shaft has a longitudinal axis and said remote control apparatus further comprises:

a) a first drive gear fixedly mounted to said drive shaft and rotatable therewith;
b) a gear shaft connected to and powered by said motor, said shaft extending parallel to and spaced from said longitudinal axis of said drive shaft, said gear shaft rotating in said first shaft direction in response to said motor operating in said first motor direction, said gear shaft rotating in said second, opposite shaft direction in response to said motor operating in said second motor direction; and
c) a second drive gear mounted on said gear shaft, said second drive gear being axially movable along said gear shaft to bring said second drive gear and said first drive gear into and out of meshing engagement with each other, said meshing engagement being required for remote movement of said vehicle from said remote location where said first and second drive gears rotate said drive shaft in said first shaft direction in response to said motor operating in said first motor direction and where said first and second drive gears rotate said drive shaft in said second, opposite shaft direction in response to said motor operating in said second motor direction.

* * * * *